CONSTANT SPEED DRIVE MECHANISM

Original Filed Nov. 25, 1957 2 Sheets-Sheet 1

INVENTOR:
WAYNE R. JOHNSON

BY: Lippincott, Smith & Ralls
ATTORNEYS

Oct. 24, 1961 W. R. JOHNSON 3,005,940

CONSTANT SPEED DRIVE MECHANISM

Original Filed Nov. 25, 1957 2 Sheets-Sheet 2

INVENTOR:
WAYNE R. JOHNSON

BY: Lippincott, Smith & Ralls
ATTORNEYS

United States Patent Office 3,005,940

Patented Oct. 24, 1961

3,005,940

CONSTANT SPEED DRIVE MECHANISM

Wayne R. Johnson, Los Angeles, Calif., assignor to Minnesota Mining & Manufacturing Company, St. Paul, Minn., a corporation of Delaware Continuation of application Ser. No. 698,627, Nov. 25, 1957. This application Feb. 2, 1959, Ser. No. 790,769
16 Claims. (Cl. 318—305)

Figure 1:
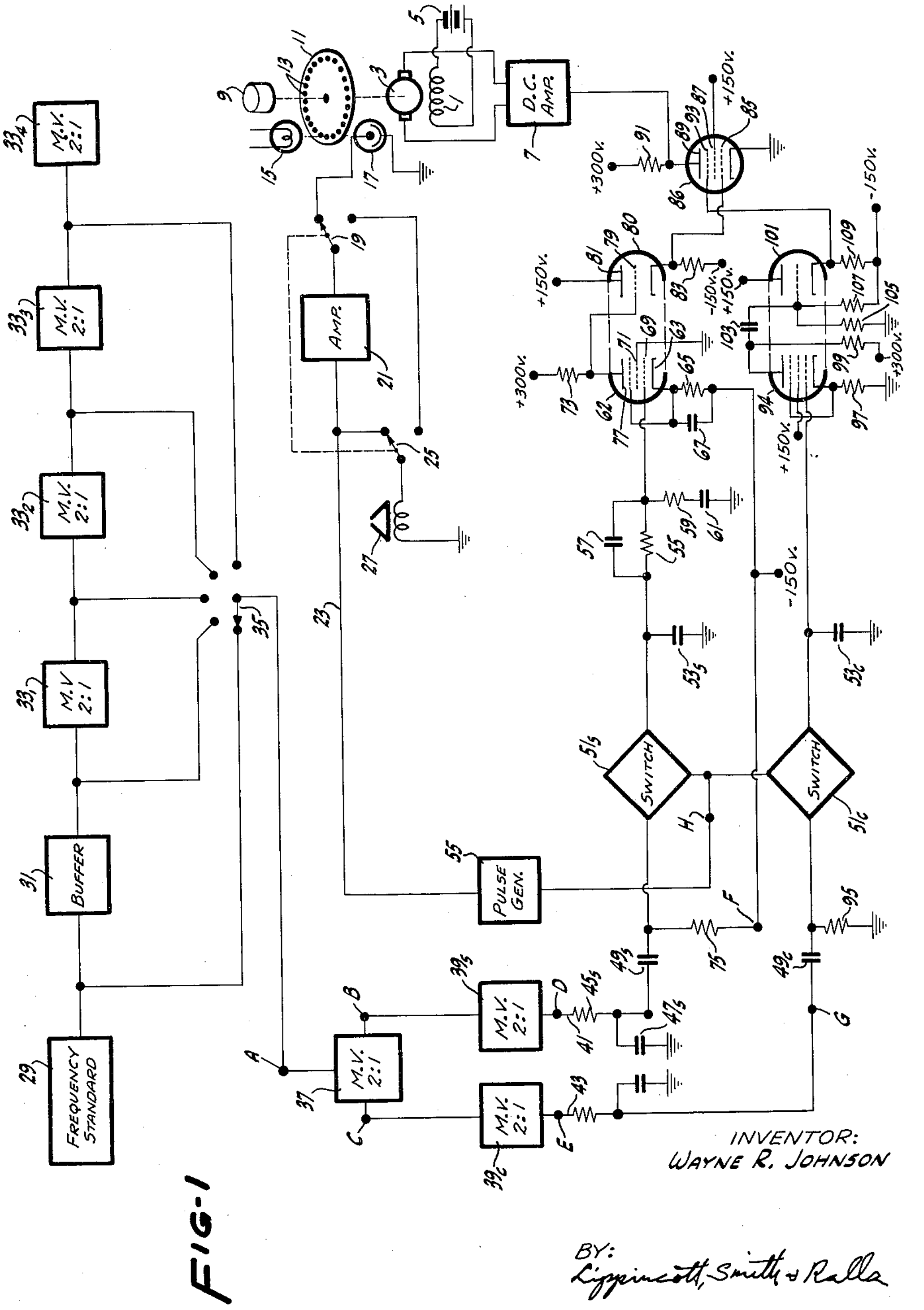

This is a continuation of copending application Serial No. 698,627, filed November 25, 1957, by Wayne R. Johnson for Constant Speed Drive Mechanism.

This invention relates to drive mechanisms for apparatus the speed whereof must be maintained accurately at a constant value when in operation, such as precision recorders and reproducers of electrical waves. While its utility is by no means limited to the example given the requirements of such apparatus are extremely rigorous and the invention will therefore be described specifically as employed for this purpose, its application to other apparatus having like requirements being obvious to those skilled in the art.

In the recording and reproduction of electrical signals of certain types, such as television signals, radar signals, telemetering signals and the like, the maintenance of constant speed of recording media in both recording and reproduction is extremely important. Variation in speed results in angular modulation of the recorded waves that may destroy the usefulness of the recording. Such variation may take the form of a more or less constant drift in the speed of the medium, from beginning to end of the recording, or more frequently, of oscillations in speed around a constant value resulting in "wow." In order to minimize such variations and reduce them to tolerable values types of feedback or servo circuits have been devised, most of which employ synchronous A.C. drives. Such drives are bulky, heavy and expensive. In airborne equipment, in particular, they are undesirable in that the entire power for the drive must usually be developed from powerful stabilized oscillators, with complicated servo circuits to control the frequency of these oscillators in the reproducing process and to compensate for variations in load upon the driving motor which would cause phase variations in either recording or reproduction.

For many reasons it would be desirable to use a shunt type D.C. motor as the driver, because of its simplicity, lightness for a given power output and reliability. The difficulty has been that while such motors are frequently referred to as "constant speed" devices, their speed in fact varies with every variation in load and to compensate them has required even more complex equipment than the use of synchronous drives.

Another requirement for drives for mechanisms of the type here contemplated is that they should not only be able to maintain a constant speed of a desired value but that they should be able to attain that speed and pull into synchronism very rapidly. Many of the devices intended to maintain constant speed are not only inactive during the pull-in period but may even inhibit the pull-in and require unduly long periods before attaining the desired speed.

Among the objects of the present invention are, therefore, to provide a drive mechanism employing a direct current shunt-type motor and at the same time to provide a precision speed control for such a motor that will not only maintain its average rotational speed at the desired value but that will also prevent deviations of instantaneous speed from the average to a high degree of accuracy, comparable to the best A.C. synchronizing systems, that will permit very rapid pull-in operation, bringing the drive to speed in less than a second, in the case of the particular drive here described, and that in the case of a tape drive for recording and reproduction, is equally applicable to both recording and the reproduction processes. Another object, particularly applicable in cases of recording equipment for telemetering indications, is to provide a drive which is equally effective at many recording and reproducing speeds which are integrally related.

Broadly considered, as indicated above, the apparatus of the present invention comprises a shunt-type D.C. motor, which forms the actual drive means. Means are provided for generating a pilot wave, the frequency whereof varies in direct proportion to the speed of the motor; for example, in a recording mechanism this can be a tachometer generator whose moving element is mounted directly on the motor shaft or, in the case of reproducing equipment, it may be a pilot wave imposed upon the record from the output of such a generator. There is also provided means for developing two waves of standard frequency, equal to the frequency of the pilot waves at the desired motor speed, whose fundamental components are in quadrature. While these may be sinusoidal waves they are preferably of square waveform, but for convenience they will be referred to as the "sine wave" and "cosine wave" irrespective of waveforms; the circuits to which they are supplied will be similarly referred to as the "sine" and "cosine" circuits.

Up to a certain point the sine and cosine circuits are identical; in a preferred embodiment, in which square waveforms are used, these waves are first fed into an integrating circuit which converts the square waveform into a triangular one. From the integrating circuit both sine and cosine circuits connect to electronic switches, connected for operation simultaneously, once in each cycle, by the pilot wave so that the switches close during a small fraction only of the standard wave cycle. Beyond the switches there is connected to each circuit a storage condenser which charges to the potential of the respective circuit each time the switch is closed, retaining this charge until recharged (or discharged) at the next cycle of the pilot wave.

Beyond the storage condensers the sine and cosine circuits differ. The sine circuit connects to the input of a variable-gain D.C. amplifier, the output whereof supplies one of the two shunt circuits of the D.C. motor. Because of its lower inductance and hence its quicker response, it is usually the armature circuit of the motor that is supplied by the ampliler. Preferably, too, the variable gain of the D.C. amplifier is achieved through including in it a modulator stage, which controls the gain in accordance with the voltages supplied by the cosine circuit as will next be described.

The output of the storage condenser in the cosine circuit connects, usually through an amplifier, to a differentiating circuit which advances the phase of any alternating component in the storage condenser charge by 90 degrees, thus converting the cosine component into a sine component, which is applied to vary the gain of the D.C. amplifier.

In operation the pilot wave closes the electronic switches in the sine and cosine circuits to sample waves existing therein simultaneously and owing to the quadrature relationship between the fundamentals of the two waves a peak of one, positive or negative, coincides with a zero of the other. In the situation where the motor is running at speed the operation stabilizes when the sampling occurs in the sine circuit on the rising branch of the sine wave, this being near the peak of the cosine wave. Actually, at the operating point the sampling recurs at substantially constant phase of the standard wave; no leak is provided for the storage condenser in this circuit and the D.C. amplifier therefore holds the charge between operations of the sampling switch and provides a constant drive for the D.C. amplifier. The latter has a high gain, although not the maximum of which it is capable but more nearly the middle of its range, as the cosine circuit is A.C. coupled and at operating speed little or no A.C. signal is present. The D.C. amplifier is so biased that in the absence of signals from the storage condenser it will supply enough current to operate the motor at some speed within its operating range and so provide starting torque as soon as rotation starts. The pilot wave immediately becomes active to operate the sampling switches. It is well recognized that a sampling operation is, in fact, a form of modulation, developing the usual modulation products. The storage condensers effectively filter out the higher frequency components, the major products remaining being the pilot frequency and the difference frequency between the pilot frequency and the standard frequency in the sine and cosine circuits, the modulation-product frequencies appearing also in quadrature in the two circuits. The differentiating network in the cosine circuit advances the phase of the frequency components in this latter circuit by 90 degrees. The phases of the various frequencies in the two circuits, with respect to each other, depends upon whether the pilot frequency is greater than or less than the standard frequency so that, referred to the signal in the sine circuit, that in the cosine circuit, after being advanced 90 degrees by the differentiating circuit, is either in phase or 180 degrees out of phase. The cosine circuit is connected to the modulating stage so poled that the sine components are additive if the pilot frequency is lower than the standard frequency and to subtract it if the reverse is the case. Accordingly, if the alternating components in the two circuits are out of synchronism instead of being merely out of phase, a modulated component is added to the current supplied to the motor as a result of the normal bias, increasing the torque on the motor and tending to pull it into step, whereas if the speed of the motor is too great the modulation components are applied in opposite phase, decreasing the torque and bringing the motor back to the speed where the phase-control signal supplied by the sine circuit alone takes charge.

Figure 2:
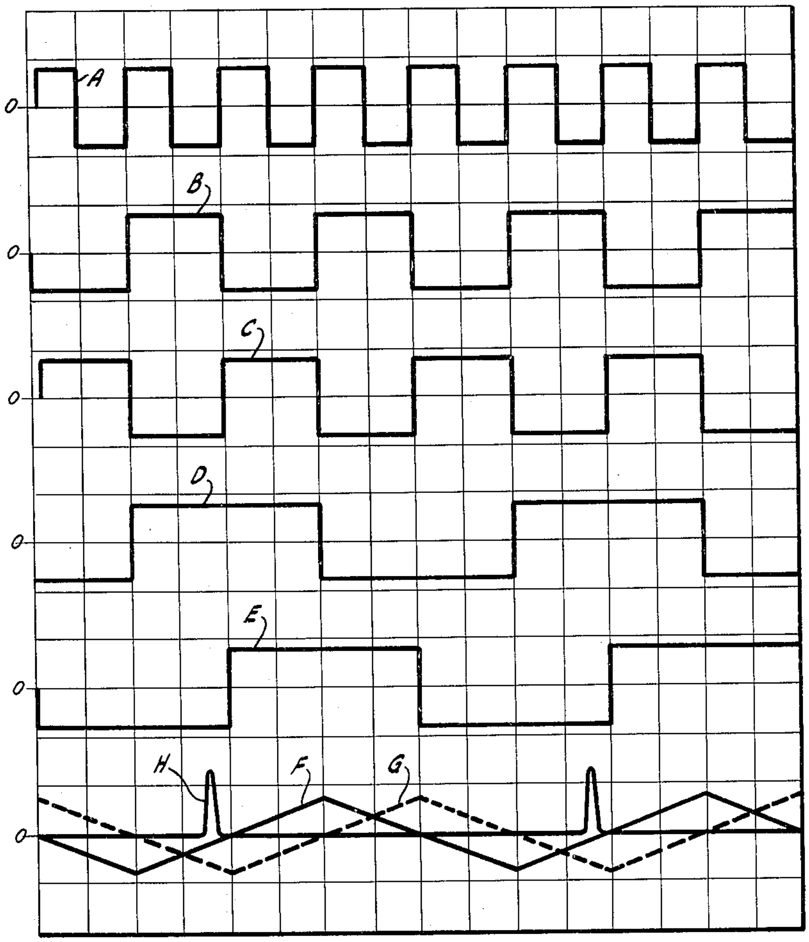

All of the above is more fully described in the detailed description of a preferred embodiment of the apparatus which follows, this description being illustrated by the accompanying drawings wherein:

FIG. 1 is a diagram partly in block form and partly schematic, illustrating the invention as applied to a magnetic tape recording and reproducing apparatus adapted to operate at any one of a plurality of tape speeds, those chosen for illustration being, respectively, 240 inches, 120 inches, 60 inches, 30 inches and 15 inches per second; and FIG. 2 comprises a number of curves illustrating the waveforms developed at various portions of the circuit of FIG. 1.

The diagram of FIG. 1 illustrates the essential features of a magnetic tape recording and reproducing mechanism embodying the present invention. The particular apparatus here described is driven by $\frac{1}{16}$ H.P., shunt-type D.C. motor whose field winding 1 and armature 3 are schematically illustrated at the extreme right of the figure. The field is excited separately to a substantially constant value by any suitable voltage source 5. The armature current is supplied from a D.C. amplifier 7, the output of which is controlled by the balance of the equipment shown.

The armature 3 drives the magnetic tape record by means of a capstan 9 mounted directly upon the motor shaft. The record tape and the balance of the tape handling mechanism are not illustrated, since they are conventional and the present invention lies in the drive and its control, rather than the equipment driven, which is postulated merely to give a concrete example of the type of requirement that can be met through the use of the invention.

In the case shown these requirements are extremely rigorous. Tape speeds of from 240 inches per second down to 15 inches per second, a ratio of 16:1 in 2:1 steps, must be maintained with complete accuracy as to synchronism and minimum deviation as to the phase of recorded and reproduced signals.

The necessary control to achieve this result is exercised by means of a pilot wave whose frequency is directly proportional to the motor speed. In the recording process this wave is developed by a tachometer generator mounted directly upon the motor shaft. While various types of such generators are available, for the present purpose, where wide variation in frequency must be accommodated, it is preferable to use a generator that will deliver a voltage independent of its speed of operation. One type having this property is that illustrated schematically in the figure; a tachometer disc 11, having a circle of equally spaced apertures 13 formed near its periphery is mounted directly upon the motor shaft. A light source 15, mounted on one side of the disc, illuminates a photocell 17, positioned on the other side of the disc, through the apertures, so that as the disc rotates a pilot signal is developed in the photocell circuit whose frequency is the product of the rotational speed of the motor and the number of apertures.

As will be developed later, the control exercised by this invention will hold the position of the armature, with respect to the norm, to within a very small fraction of a cycle of the pilot wave frequency. It is desirable that there should be many cycles of the pilot wave per revolution of the armature, for the higher the relative frequency of the pilot wave the more accurate the control. In the present instance 175 apertures are used in the tachometer disc and the size of the capstan is such that at the highest tape speed of 240 inches per second the motor speed is approximately 3600 r.p.m. or 60 revolutions per second. At the high speed, therefore, the tachometer develops a frequency of approximately 10 kilocycles per second. Since the tape speed is determined by both the capstan diameter and the motor speed the exact speed is not too important, a slight deviation of the motor speed from the assumed value can be compensated by an opposite proportional change in capstan diameter and therefore, for convenience in the description, it will be assumed that the proper tape speed of 240 inches per second is developed when the pilot frequency is exactly 10 kc. At the slower speeds the pilot frequency developed by the tachometer will be successive binary submultiplies of the pilot frequency, 5 kc., 2½ kc., etc., down to 0.625 kc. at the 15 inch per second tape speed.

The pilot signal, of whatever value, is fed through a switch 19, to an amplifier 21, the output of the amplifier connecting to a tachometer lead 23. This same signal is also supplied through a switch 25 to a transducer head 27, which records the same signal upon the tape. It may be noted at this time that switches 19 and 25 are preferably mechanically interconnected or ganged so that in the playback position the photocell circuit is disconnected from the amplifier 21 and the transducer head disconnected from the amplifier output and connected to its input. The transducer head therefore picks up the pilot frequency on playback and supplies it to the tachometer lead 23. As in a properly designed tape drive no measurable slip occurs between the tape and the capstan that drives it, the pilot signal in reproduction is still directly proportional to the motor speed and, in effect, a tachometer signal. Owing to changes in dimension of the tape through variations in temperature, humidity or other less obvious factors there may be very slight differences in motor speed during recording and playback in recording and reproducing the same frequency. The pilot signal will, however, always bear the proper relationship to the other signals that may be recorded on the tape, playing back the recorded signals at their original value.

The motor control is exercised through the comparison of the pilot signal with standard or comparison signals of the same frequency. To develop these signals a stabilized oscillator 29 is used. This oscillator may, for example, be a crystal controlled oscillator operating at 40 kc.: i.e., at four times the highest frequency at which the tachometer is to be stabilized. In order to minimize the load upon the oscillator it connects through a buffer amplifier 31 to a cascade of binary frequency dividers designated as $33_1$, $33_2$, $33_3$ and $33_4$. The accuracy of control is increased if the final stage of the buffer amplifier is over-driven so that it delivers a substantially square waveform to the frequency dividers. The input and output terminals of each of the frequency dividers connect to the various contacts of a multi-point switch 35 by means of which it is possible to select either the 40 kc. frequency developed directly by the standard frequency oscillator or any of its binary submultiples down to 2.5 kc.

As is customary in binary frequency division, the frequency dividers used are preferably bistable multivibrators or Eccles-Jordan flip-flops. Switch 35 connects the signals developed at the terminals of any selected one of these flip-flops to the input of a similar frequency divider 37. There are available at the output of this multivibrator square waves of half the input frequency and of opposite phase. Both of these waves are used; one, designated as "zero phase" connects to a further multivibrator designated as $39_c$, the other, of "180° phase," is supplied to a similar divider $39_s$. The result is that in the output of this pair of frequency dividers there appear two square waves of the same frequency, the fundamental components whereof are displaced in phase by 90 degrees and therefore the output circuits of the dividers can be conveniently referred to as the "sine circuit" 41 and the "cosine circuit" 43. It may be noted that if the apparatus were intended to operate at a single speed only, any method of developing sine and cosine waves could be used. These would not necessarily have to be square waves, although, as will be shown, there is marked advantage in the square waveform. The advantage of the arrangement shown is that the two standard frequency waves developed by it are accurately displaced by 90 degrees irrespective of the frequency at which they are operated.

The various phase relationships are shown in the waveform diagrams of FIG. 2. In this figure curve A illustrates the waveform delivered at point A in FIG. 1, i.e., the input of the divider 37. Waveform B is that at point B and waveform C that at point C, the inputs to voltage divider $39_c$ and $39_s$ respectively. In each case it is assumed that all of the frequency dividers are designed to trigger on the rise of the input wave and that the rise-time of each of these is so short in comparison with the periods of the waves that the rise can be considered instantaneous. In like manner waveform D is that of the output of frequency divider $39_s$ and E that of the output of $39_c$. A common time base is employed for all of the waveform curves of this figure to indicate the phase relationships between the waves at the successive points of the circuits.

Waveform D, in the sine circuit, is applied through a series resistor $45_s$ to a shunt condenser $47_s$. Resistor and condenser combine to form an integrating circuit, beyond which a blocking condenser $49_s$ is inserted in series in the sine circuit. With this arrangement, since there is no leak to ground across condenser $47_s$, its charge is determined wholly by the currents supplied to it from the frequency divider. The result is that the square waveform is integrated into a substantially pure triangular waveform which appears at point F in the circuit and is illustrated in the curve F of FIG. 2.

A similar integrating circuit, the elements whereof are designated by the same reference characters as those in the sine circuit but distinguished by the subscripts *c*, is included in the cosine circuit, thus developing at the point G, the input to condenser $49_c$, a waveform shown in the curve G of FIG. 2. Curves F and G are superposed, curve G being dotted in order to illustrate the relative phase relationships between these two curves.

Beyond the blocking condensers 49 the sine and cosine circuits connect to electronic switches, illustrated symbolically at $51_s$ and $51_c$. These switches operate to close the circuit connected to their respective outputs only when a voltage of proper sign is applied to a control circuit. Many such switches have been devised. The ordinary type of ring modulator, familiar in telephone carrier circuits, will operate in this manner provided one of its inputs is supplied with unidirectional pulses. Another such switch is shown in "Waveforms," vol. 19, Radiation Laboratories Series (McGraw-Hill 1949), page 374. This latter switch is the one employed in the circuit here described, but this is a matter of engineering choice. The characteristic required of the switch used is that it be bidirectional; i.e., that it pass current of either positive or negative polarity during the actuating pulse and open the circuit between its input and its output in the absence of the control voltage.

The outputs of the two switches connect to small shunt storage condensers $53_s$ and $53_c$. It may be noted that no conductor or leak-path is provided across the storage condensers 53. Accordingly, when the switches 51 are closed, the condensers charge to the potential present at that instant in the sine or cosine signal, as the case may be, and retain that charge until the next closure of the switch.

The control voltage for closing the switches 51 is applied from the tachometer line 23. The invention will operate directly from the positive (or negative) half-cycles of the pilot signal, but its accuracy of control is greatly increased by developing unidirectional pulses whose duration is short in comparison with the period of the pilot wave and which occur at a constant phase of the pilot. Accordingly, there is preferably inserted in the pilot signal lead a pulse generator 55, which converts the substantially sinusoidal wave into a train of such short, unidirectional pulses. As in the case of the switches, the pulse generator may take any of several forms. One such form is a clipping circuit that passes only the extreme peaks of the positive half waves, e.g., a back-biased diode or a Zener diode. Another form, frequently used, is a differentiating circuit which generates a pulse when the pilot wave is changing most rapidly, as it crosses the zero axis. If this latter form is used both positive and negative pulses are generated. It so happens that with neither of the forms of switches that have been specifically mentioned is it necessary to suppress a "negative" pulse, although in other forms of switch this may be desirable. Where ring modulator is used as a switch a positive pulse sampling a positive wave will deliver a positive output, while a negative pulse, occurring one-half cycle later, will sample a wave in negative phase and also yield a positive output, so that the only effect is to take twice as many samples as where only the positive pulse is used. The type of switch shown in the "Waveforms" citation given above is responsive to pulses of one sign only; while the actuating pulses may be of either polarity they are here shown as positive with respect to the A.C. axis.

Curve H of FIG. 2 indicates the position of the pulses in respect to waves F and G at approximately the position at which they occur when stable operation of the apparatus has been established. It will be noted that it samples the "sine" wave very near to the point where it crosses the zero axis and hence the charge on the storage condenser $53_s$ is small, whether positive or negative. The same sampling instant, however, corresponds with very nearly the maximum of the "cosine" wave and a maximum charge is therefore applied to storage condenser $53_c$.

Beyond the storage condensers 53 the sine and cosine circuits are no longer symmetrical. In normal operation, after synchronous operation has been established, the control is exercised primarily by the sine circuit. This circuit forms a portion of a high-gain feedback loop, and while after stable operation is established its operation is substantially on direct current, during acceleration, until the motor reaches pull-in speed, it carries alternating components of relatively high amplitude. Since as has already been mentioned, the sampling operation performed by the switches 51 is essentially a modulation process, the frequencies developed include as nominal components, the sum and difference frequencies of the pilot and standard-frequency waves. Within the range of frequencies thus developed, some phase-shift will occur in the motor circuits and with the high gain that is desirable the amplifier may become unstable at extreme frequencies. To compensate for such phase-shift it is therefore preferable to include a lead-lag network comprising a series resistor 55 of, say, about 1 megohm value, shunted by a 0.02 microfarad condenser, followed by shunt arm comprising a 100 kilohm resistor 59 in series with a 1 microfarad condenser 61. The use of such lead-lag networks is conventional and it will be understood that the specific values given are those appropriate to the particular circuit elements later to be described. Other elements or other frequency ranges might require different constants but those given are typical.

Following the lead-lag network the sine circuit connects to a direct-coupled, D.C. amplifier of variable gain, depending on the magnitude of a control voltage. In the present instance the first stage of this amplifier is the pentode section 62 of a dual 6U8 pentode-triode. The cathode 63 of this tube connects to a −150 v. supply through a 3 kilohm cathode resistor 65, bridged by a by-pass condenser 67. The control grid 69 connects directly to the junction between the series and shunt arms of the lead-lag network and the screen grid 71 is grounded. The plate connects to a positive supply through an anode resistor 73. In order to establish the proper relative operating voltage between the control grid and the cathode, a lead from the −150 v. source connects through a 100 kilohm resistor 75 to the input side of the switch $51_s$. This establishes the initial potential of the condenser $53_s$ at the −150 v. level; the alternating components supplied through the blocking condenser $49_s$ therefore serve to charge and discharge this condenser with respect to −150 v. as the norm, being superposed with respect to ground, upon the 150 v. negative bias.

The anode 77 of the pentode section is directly connected to the control grid 79 of the triode section 80 of the tube. The triode section is operated as a cathode follower, the anode 81 connecting directly to a +50 v. source, the cathode connecting back to the −150 v. source through cathode resistor 83.

The voltage across the cathode resistor is applied directly to the control grid 85 of a pentode that controls the gain of the amplifier and is, in fact, a modulator. The cathode of this tube operates at ground potential; the screen grid 87 operates at approximately +150 v. while its anode 89 connects to a +300 v. source through a load resistor 91. The suppressor grid 93 is supplied from the cosine circuit that will next be described.

The cosine circuit is A.C. connected and comprises an amplifier using the same type of dual tube (a 6U8) as is used in the sine circuit. As used in the cosine circuit, however, the control grid of the pentode section 94 of this tube connects directly to storage condenser $53_c$ and its normal operating point is established at ground potential by the grid resistor 95, connected, as is the case in the sine circuit, ahead of the sampling switch. The tube is biased through cathode resistor 97, connected to ground. Anode current is supplied through the usual resistor 99 from the +300 v. source.

The triode section 101 of the dual tube is coupled to the pentode section through a differentiating network comprising a series condenser 103 and a shunt resistance network including a resistor 105, that connects directly to ground, and a second resistor 107 that connects to the −150 v. source. It will be seen that these two resistors are effectively in parallel for the A.C. components. The control grid of the triode section connects to the junction of the two resistors which act as a voltage divider to apply the proper operating potential to the grid. The tube is connected as a cathode follower, with its output circuit comprising cathode resistor 109. The cathode connects to the suppressor grid 93 of the modulator tube as previously mentioned. The output of the modulator connects to the input of the conventional D.C. amplifier 7 that supplies armature current to the drive motor.

In describing the operation of the apparatus it is convenient to consider first the normal running condition, where the motor speed has stabilized so that the frequency of the pilot signal is equal to the standard frequency in the sine and cosine circuits. When this is the case the sampling pulses always occur at very nearly the same phase of the standard frequency cycle, it being understood that for convenience the "phase" of the triangular wave means the phase of the fundamental frequency thereof.

As shown by curves F, G and H of FIG. 2, at the stabilizing point the sampling occurs very near the zero axis of the sine wave and very near the negative peak of the cosine wave, for the highest tape speed, with the preferred adjustment of the apparatus; for lower speeds sampling occurs farther to the left. If it should happen that the various amplifier stages in the cascade supplying the motor armature have their operating points so chosen that no signal voltage on condenser $53_s$ results in a D.C. output to the armature just sufficient to operate the motor at the desired speed, the sampling would take place at exactly zero of the sine wave. It is highly unlikely that this precise situation will be met; it certainly will not be met at all tape speeds, for the load on the motor will obviously be much less at 15 inches per second than at 240 inches. The operating point of the amplifier will preferably be set approximately correctly for an armature speed, somewhat above the highest required, so that with zero signal voltage on condenser $53_s$ the motor would run somewhat too fast for 240″ operation.

As a result, when the apparatus has reached synchronism, there is a constant tendency for the armature to pull ahead of the desired speed, making the sampling point come earlier in successive cycles and move the pulse, as illustrated in FIG. 2, farther to the left. This results in an increasing negative charge on condenser $53_s$, decreasing the current supply to the armature, and consequently the motor torque and the speed. The sampling point, therefore, quickly stabilizes at about the point shown in the figure, assuming the switch 35 to be set for the maximum tape speed. For lower speeds the sampling point will be still farther to the left.

Where only a single tape speed is required the operating points of the various amplifiers can be set so that with no charge on condenser $53_s$ the armature current is either higher, lower or equal to the current required at synchronous speed. The setting should always be greater than that required for one-half the desired speed, since under these conditions lock-in can occur on a sub-harmonic of the standard frequency. Maximum current at zero signal has been found to prevent this and as this latter setting of the operating point also gives maximum starting torque and quickest lock-in it is always to be preferred, even though it is not a necessary condition for operation.

By postulate the D.C. amplifier has a high gain and a relatively small signal voltage on condenser $53_s$ will make a relatively large change in armature current. Accordingly, at high tape speeds the sampling pulses from the pilot signal will lag, moving the pulse H to the right in the figure and charging condenser $53_s$ to a positive potential which increases the current through the pentode section of tube 62. This drives the grid 79 of the triode section negative, the cathode also goes negative, decreasing the current in the modulator tube and driving the input of the D.C. amplifier 7 positive to increase the armature current. At lower tape speeds the pilot signal tends to lead the standard frequency moving the sampling frequency to the negative side of the A.C. axis reducing the armature speed to proper value.

Where the sine component is sampled at near zero the simultaneous sampling of the cosine component occurs near the negative maximum. This results in minimum current through pentode section 94 but because the sampling occurs at substantially constant phase of the standard frequency waves the charge on condenser $53_c$ remains substantially constant, without any material A.C. component. Since the cathode follower stage 101 is A.C. coupled to the circuit the result is that no signal is supplied to suppressor grid 93 of the modulating tube, which accordingly operates at substantially constant potential, in this case near but positive to the cathode potential.

In practice, of course, such a completely static situation as regards the charges on condensers 53 does not occur; there will be some hunting, very small, about the average speed. This hunting tends to be sinusoidal in nature, moving the sampling point up and down the slope of the curve F to develop essentially a sine wave in the output of both condensers. Actually, of course, the output will be a stepped wave, because of the intermittent sampling, but as the hunting that does occur is normally at low frequency, somewhere in the order of 20 cycles per second, at maximum tape speed, so many samples are taken in each cycle of the hunting that the resulting A.C. components can be taken as sinusoidal without any material error. The phases of the sinusoidal signals thus developed in the sine and cosine circuits are in the same relation as the phases of the respective standard frequency waves in these circuits; i.e., the phase of the signal in the cosine circuit lags 90 degrees that in the sine circuit. The cosine signal is supplied to the cathode follower section 101, however, through a differentiating network, which advances the phase of the cosine signal by 90 degrees and brings it into phase with that in the sine circuit. A modulator tube is a multiplier, supplying these alternating components in-phase to the control and suppressor grids respectively of the multiplier tube. Since they change sign, from positive to negative, simultaneously, the product is always a positive number during stable-state operation. Therefore, the net effect of the cosine component multiplied by the sine component is to increase the amplification of the modulating tube so that the cosine component aids the sine component in control.

Although the effect of the differentiating circuit is always to advance the phase of the alternating components by 90 degrees, the amplitude of the differential signal is not constant but is directly proportional to frequency. as a result the control exercised by the cosine circuit is negligible for very slow hunting rates while it becomes greater at rapid hunting rates. In the control of hunting, under stabilized, running conditions, the effect of the cosine signal is small, but what effect it has is in the proper direction to give good control.

The primary purpose of the cosine circuit is in starting the motor and pulling it into phase. At the instant of closing the motor switch there is, of course, no pilot signal to sample the standard wave in either circuit. The current supplied from the D.C. amplifier at this first instant is the normal running current as determined by the operating points of the D.C. amplifier, as is the case when the sampling occurs at zero of the sine wave. As soon as rotation starts, however, sampling starts to occur. Owing to the step nature of the sampled waves and the rapidly changing conditions, an exact analysis of the inter-relationships between the outputs of the two control circuits as applied to the modulator tube is somewhat difficult. Since sampling is a form of modulation, however, the principal components normally present in a modulated output do occur, but with changing amplitude as the relative frequencies approach each other. At the start of the operation the sampling frequency dominates, but as synchronism is approached the dominant frequency in both outputs is the difference component. Under all circumstances, however, the sine and consine relationship is maintained between the modulation products in the two circuits and due to the advance in phase resulting from the differentiating circuit supplying cathode follower 101, the effect is always to increase the output of the modulator tube up to the point when synchronism occurs, as has already been described in connection with the control of hunting.

As synchronism is approached, the waveform of the output of both circuits approaches the triangular waveform of the standard frequency waves, occurring at the difference frequency, but stepped at the sampling frequency, and always in the direction to assist the pull-in.

While, in ordinary operation, the function of the cosine circuit is to assist in speeding up the motor to the pull-in point, there may be conditions where it is necessary to slow it down. Thus, for example, the apparatus might be started initially with the switch 35 connected to run the tape at high speed, say 240 inches per second, when what was actually desired was a recording at a lower speed, say 60 inches per second. In this case the pilot frequency is greater instead of less than the standard frequency. The difference frequency is still the dominant frequency in the output of the sine and cosine circuits. In the sine circuit however, the difference component changes sign when the sampling frequency becomes greater than the standard frequency, while the cosine function does not change sign. The phase advance in the differentiating network therefore brings the difference frequency components out-of-phase, as applied to the control and suppressor grids of the modulator tube, instead of in-phase and as a result the product of the two waves as applied to these grids is always a negative number, tending to decrease the armature current instead of increase it, and again pulling the motor into step where the sine circuit can take over its normal control.

It should be apparent from the foregoing that the apparatus will operate with sine-wave instead of square-wave control signals, since the reasoning that has been applied has referred primarily to the fundamental components of all of the waves. This has been done for the purpose of simplicity only, since the factors discussed are generally true as regards all components considered separately. The advantage of using triangular waves arises from the fact that the range through which control by the sine circuit can be exercised is much greater, covering phase differences of a complete half cycle instead of only a few degrees on either side of the zero point, where the rate of change of the sine wave is greatest. By proper amplification the slope of the entire half cycle of the wave may be made as great as the steep portion of a corresponding sine wave.

The sensitivity and speed of response of the feedback loop are very high. It will respond to deviations in motor speeds occurring at rates as high as 60 cycles per second; this is the fastest rotational rate of the motor used and the circuit is therefore more than ample to take care of any normal hunting. At lower speeds it is even able to compensate for some capstan eccentricity, although in any propely constructed apparatus this is the least important source of error.

With a properly constructed drive, employing a truly concentric capstan, it has been found that the maximum hunting that occurs at the 240 inch tape speed, corresponding to a 10 kc. standard frequency is $\pm 0.1$ microsecond. This is $\frac{1}{10}$ of one percent of a pilot frequency cycle or about 7 seconds of arc of the armature position.

This is comparable to the best that can be obtained using synchronous motors.

It will be recognized by those skilled in the art that the actual organization of apparatus shown and described can be modified in many ways and still perform the required functions. As described, a positive voltage on condenser $53_s$ increases the armature current; one more or one less anode-coupled stage in the D.C. amplifier would cause such a positive voltage to decrease armature current but the operation would be exactly the same except that stabilization would occur when the sampling pulse took place one-half cycle displaced from that shown in the curves; on the descending side of curve F instead of the ascending side. The phase relationships can be juggled almost at will provided the signals appear in the proper phase, relative to each other, in the device controlling the gain of the D.C. amplifier. Thus, for example, the cosine wave is described as such because it lags the waves in the sine circuit by 90 degrees. If it were reversed in phase, i.e., if the wave were taken from the other terminal of frequency divider $39_c$ it would lead by 90 degrees. If, however, the sampling pulse were applied to a ring modulator as switch $51_c$ also in reverse phase, the double reversal would result in bringing back the relationships that have been explained in detail. The criteria are that the waves are displaced by 90° and that the resultant waves as applied to the modulator yield a number of the proper sign when multiplied so that if the pilot frequency is lower than the standard frequency the overall amplification is increased and if the pilot frequency is the higher it is decreased. Beyond this the terms "sine" and "cosine" are for identification only.

Another example of flexibility of design is the final modulator wherein the sine component and the 90 degree-advanced cosine component are combined. Any type of modulator that will multiply the plus sine component by the plus-or-minus sine component is satisfactory and it will be realized that this describes substantially any amplitude modulator.

The organization of apparatus shown is therefore intended to be illustrative only and not as limiting the scope of the invention, all intended limitations being expressly set forth in the claims that follow.

I claim:

1. A constant-speed drive for recording mechanisms and the like comprising a shunt-type D.C. motor, means driven by said motor for generating a pilot wave the frequency whereof varies directly with the rotational speed of said motor, and means for locking the rotational speed of said motor at a desired value giving a fixed frequency from said generating means comprising means for developing two electrical waves of said fixed frequency the fundamental components whereof are in phase quadrature and supplying said electrical waves to a sine wave circuit and a cosine wave circuit respectively, means actuated by said pilot wave for simultaneously sampling the instantaneous magnitudes of the waves in said sine and cosine circuits, condensers connected in shunt in each of said circuits for storing charges proportional to said samples between sampling intervals, D.C. amplifying means responsive to the magnitude of the charge on the condenser in said sine circuit connected to supply operating current to one of the shunt circuits of said D.C. motor, means connected in said cosine circuit for advancing the phase of any alternating component in the charge of the condenser connected therein, and modulating means interconnecting said sine and cosine circuits to control the output of said D.C. amplifying means in proportion to the product of the outputs of said sine and cosine circuits.

2. A constant-speed drive as defined in claim 1 wherein said means for developing two electrical waves develops waves of triangular wave-form.

3. A constant-speed drive as defined in claim 1 wherein said sampling means includes means for deriving from said pilot wave a train of pulses recurring at pilot-wave frequency and switching means operative to close said sine and cosine circuits respectively to said condensers during said pulses only.

4. A constant-speed drive for recording mechanisms and the like comprising a shunt-type D.C. motor and means driven by said motor for generating a pilot wave of a frequency directly proportional to the rotational speed of said motor, and means for locking the rotational speed of said motor at a desired value giving a fixed frequency of said pilot wave comprising a source of electrical oscillations of 4 times said fixed frequency, a first binary frequency divider driven by said source, a pair of binary frequency dividers connected to be driven by opposite phases of said first frequency divider and each adapted to provide a substantially square-wave output, a sine wave circuit and a cosine wave circuit connected respectively to one of said pair of frequency dividers and each including, in succession, integrating means for converting the square waves therein to triangular waves, an electronic switch and a storage condenser connected to be charged to the potential of the circuit to which it is connected when said electronic switches are closed; a variable-gain D.C. amplifier connected from the storage condenser in said sine circuit to supply current to one of the shunt circuits of said D.C. motor, an A.C. amplifier connected from the storage condenser in said cosine circuit and including a differentiating network for advancing the phase of A.C. components therein, connections for supplying said components to control the gain of said D.C. amplifier; and connections from said pilot-wave generating means to both of said electronic switches to close said switches simultaneously during a limited portion of each cycle of said pilot wave.

5. A drive mechanism as defined in claim 4 including means in said connections from said pilot wave generating means for developing from said pilot wave a train of sharp pulses of pilot-wave repetition frequency for actuating said electronic switches.

6. A drive mechanism as defined in claim 4 for operating recording mechanisms and the like at any selected one of a plurality of integrally related constant speeds wherein said source of oscillations comprises an oscillator operative at an integral of all of the fixed frequencies developed by said pilot wave generator at desired rotational speeds and at least 4 times said fixed frequency at the highest of said fixed speeds, a plurality of frequency dividers connected in cascade to said oscillator, and switching means for connecting said first frequency divider recited in claim 4 optionally to the terminals of any of said cascade-connected frequency dividers.

7. In combination for controlling the speed of a motor in driving a medium capable of recording and reproducing information, means coupled to the motor for generating a pilot signal having a frequency related to the speed of the motor, means for generating a standard signal at a particular frequency, means responsive to the pilot and standard signals for generating a first alternating signal having characteristics related to any difference between the frequencies of the pilot and standard signals, means responsive to the pilot and standard signals for generating a second alternating signal having characteristics related to any difference between the frequencies of the pilot and standard signals and having, relative to the first alternating signal, a polarity dependent upon the relative frequencies of the pilot and standard signals, and means responsive to the first and second alternating signals for regulating the speed of the motor.

8. In combination for controlling the speed of a motor in driving a medium capable of recording and reproducing information, electrical circuitry responsive to the speed of the motor for providing pilot pulses at a rate related to the speed of the motor, electrical circuitry for providing a standard signal at a particular frequency, electrical circuitry including first gating means responsive to the pilot pulses and the standard signals for producing a first alternating signal having an amplitude dependent upon the frequency of the standard signals and the rate of the pilot pulses, electrical circuitry including second gating means responsive to the pilot pulses and the standard signals for producing a second alternating signal having an amplitude dependent upon the change of any difference between the standard signals and the pilot pulses and having, relative to the first alternating signal, a polarity dependent upon the relative frequencies of the standard signal and the pilot pulses, and electrical circuitry responsive to the first and second alternating signals for combining said first and said second alternating signals for producing signals for introduction to the motor and having characteristics for regulating the speed of the motor.

9. In combination for controlling the speed of a motor in driving a medium capable of recording and reproducing information, means responsive to the speed of the motor for generating pilot signals at a frequency related to the speed of the motor, means for generating two different standard signals at the same particular frequency, first control means responsive to one of the two standard signals and to the pilot signals for generating first control signals having characteristics to maintain the speed of the motor at a particular relationship to the frequency of the standard signals, second control means responsive to the other of the two standard signals and to the pilot signals for generating second control signals having characteristics to obtain a quick acceleration of the motor to the desired speed from a starting position, and means responsive to the first and second control signals for combining the first and the second control signals to produce signals for introduction to the motor and having characteristics for regulating the speed of the motor.

10. In combination for controlling the speed of a motor in driving a medium capable of recording and reproducing information, electrical circuitry responsive to the speed of the motor for producing a pilot signal having a frequency related to the speed of the motor, electrical circuitry for producing a standard signal at a substantially constant frequency, electrical circuitry responsive to the standard and pilot signals for producing a first control signal having characteristics related to the difference in frequencies between the standard and pilot signals, electrical circuitry responsive to the standard and pilot signals for producing a second control signal having characteristics dependent upon the relative frequencies of the pilot and standard signals, and electrical circuitry responsive to the first and second control signals for combining the first and the second control signals to generate a signal for introduction to the motor tc regulate the speed of the motor.

11. In combination for controlling the speed of a motor in driving a medium capable of recording and reproducing information, electrical circuitry for providing standard signals at a particular frequency, electrical circuitry responsive to the signals at the standard frequency for producing a pair of signals at the standard frequency with a particular phase relationship to each other, electrical circuitry responsive to the speed of the motor for producing pilot signals having a frequency related to the speed of the motor, electrical circuitry responsive to the pilot signals and to one of the standard signals in the pair for producing a first alternating signal having characteristics related to any differences between the frequencies of the standard and pilot frequencies, electrical circuitry responsive to the pilot signals and to the other of the standard signals in the pair for producing a second alternating signal having characteristics related to the frequencies of the pilot and standard signals and having, relative to the first alternating signal, a polarity dependent upon the relative frequencies of the pilot and standard signals, and electrical circuitry including a direct current amplifier responsive to the first and second alternating signals for combining the first and second alternating signals to produce a control varying direct current signal for introduction to the motor and having characteristics for regulating the speed of the motor.

12. In combination for controlling the speed of a motor in driving a medium capable of recording and reproducing informaton, means for providing a pair of standard signals both at a first frequency but at different phases, means responsive to the motor for providing pilot pulses at a rate related to the speed of the motor, means including first energy-storage means responsive to one of the pair of standard signals and to the pilot pulses for storing in the energy-storage means an amount of energy dependent upon the relative frequencies of one of the standard signals and the pilot pulses, means including second energy-storage means responsive to the other one of the pair of standard signals and to the pilot pulses for storing in the second energy-storage means an amount of energy dependent upon the relative frequencies of the other of the standard signals and the pilot pulses, and means including control means responsive to the energy levels in the first storage means and in the second storage means to produce a signal for introduction to the motor and having characteristics for regulating the speed of the motor.

13. In combination for controlling the speed of a motor in driving a medium capable of recording and reproducing information, electrical circuitry responsive to the speed of the motor for producing pilot pulses at a rate related to the speed of the motor, electrical circuitry for producing first standard signals having a particular frequency, electrical circuitry responsive to the standard signals for producing second and third standard signals having a frequency related to the frequency of the first standard signals and having a particular phase relationship to each other, electrical circuitry including first switching means responsive to the pilot pulses and to the second standard signals and including first energy-storage means coupled electrically to the first switching means for producing a first control signal having characteristics dependent upon the rate of the pilot pulses relative to the frequency of the first signals, electrical circuitry including second switching means responsive to the pilot pulses and to the third standard signals and including second energy-storage means coupled electrically to the second switching means for producing second control signals having characteristics dependent upon the rate of the pilot pulses relative to the frequency of the first signals, and electrical circuitry including a modulator responsive to the first and second control signals for producing a voltage for introduction to the motor and having characteristics for regulating the speed of the motor.

14. In combination for controlling the speed of a motor in driving a medium capable of reading and recording information, means for providing first and second standard signals each having the same particular frequency and each having a particular different phase relative to the other signal and each having a wave form progressively varying between first and second amplitudes, means responsive to the speed of the motor and to the first standard signal for reproducing the amplitude of the first standard signal at particular instants in successive cycles of the first standard signal in accordance with the speed of the motor relative to the frequency of the first standard signal, means responsive to the speed of the motor and to the second standard signal for reproducing the amplitude of the second standard signal at the particular instants in accordance with the speed of the motor relative to the frequency of the second standard signal, and means responsive to the reproduced amplitudes of the first and second standard signals for combining the reproduced amplitudes of the first and second standard signals to produce a control signal having characteristics for regulating the speed of the motor.

15. In combination for controlling the speed of a motor in driving a medium capable of reading and recording information, means including first electrical circuitry for providing first and second standard signals each having a particular frequency and each having a particular different phase relative to the other and each having a triangular configuration in successive half cycles, means including second electrical circuitry responsive to the speed of the motor and to the first standard signals and including first energy-storage means for storing in the energy-storage means an amount of energy related to the amplitude of the first standard signal at particular instants in successive cycles and in accordance with the speed of the motor relative to the frequency of the first standard signals, means including third electrical circuitry responsive to the speed of the motor and to the second standard signals and including second energy-storage means for storing in the energy-storage means an amount of energy related to the amplitude of the second standard signal at the particular instants and in accordance with the speed of the motor relative to the frequencies of the second standard signals, and means including fourth electrical circuitry responsive to the energy levels in the first and second storage means for producing a control signal having characteristics for regulating the speed of the motor.

16. In combination for controlling the speed of a motor, means driven by the motor for generating a pilot wave the frequency whereof varies directly with the rotational speed of the motor, means for developing two reference electrical waves of fixed frequency and in phase quadrature with each other, first means coupled to said generating means and to said developing means for providing a first control signal in accordance with the difference of frequencies between the pilot wave and one of the two reference electrical waves, second means coupled to said generating means and to said developing means for providing a second control signal in accordance with the difference of the frequencies between the pilot wave and the other one of the two reference electrical waves, means coupled to said second means for advancing the phase of any alternating component of the second control signal, and direct current amplifying means coupled to said first means and to said phase advancing means for amplifying the first control signal and the phase advanced component of the second control signal to provide a composite control signal for introduction to the motor for controlling the speed of the motor.

References Cited in the file of this patent

UNITED STATES PATENTS

| | | |
|---|---|---|
| 2,749,496 | Newman et al. | June 5, 1956 |
| 2,782,355 | Wilcox | Feb. 19, 1957 |